(12) United States Patent
Liang et al.

(10) Patent No.: US 6,758,954 B2
(45) Date of Patent: Jul. 6, 2004

(54) ELECTRODEIONIZATION APPARATUS WITH RESILIENT ENDBLOCK

(75) Inventors: Li-Shiang Liang, Harvard, MA (US); Emile O. Montminy, Lowell, MA (US)

(73) Assignee: U.S. Filter Corporation, Palm Desert, CA (US)

(*) Notice: Subject to any disclaimer, the term of this patent is extended or adjusted under 35 U.S.C. 154(b) by 217 days.

(21) Appl. No.: 10/121,133

(22) Filed: Apr. 11, 2002

(65) Prior Publication Data

US 2003/0192783 A1 Oct. 16, 2003

(51) Int. Cl.[7] .................................................. C02F 1/40
(52) U.S. Cl. ...................................... 204/632; 204/634
(58) Field of Search ................................ 204/632, 634

(56) References Cited

U.S. PATENT DOCUMENTS

| | | | |
|---|---|---|---|
| 4,632,745 A | 12/1986 | Giuffrida et al. | 204/301 |
| 4,925,541 A | 5/1990 | Giuffrida et al. | 204/182.5 |
| 5,154,809 A | 10/1992 | Oren et al. | 204/182.4 |
| 5,211,823 A | 5/1993 | Giuffrida et al. | 204/182.4 |
| 5,240,579 A | 8/1993 | Kedem | 204/182.4 |
| 5,259,936 A | 11/1993 | Ganzi | 204/131 |
| 5,292,422 A | 3/1994 | Liang et al. | 204/301 |
| 5,316,637 A | 5/1994 | Ganzi et al. | 204/182.4 |
| 5,702,582 A | 12/1997 | Goldstein et al. | 204/632 |
| 6,235,166 B1 | 5/2001 | Towe et al. | 204/263 |
| 6,284,115 B1 | 9/2001 | Apffel | 204/518 |
| 6,607,647 B2 * | 8/2003 | Wilkins et al. | 204/523 |

FOREIGN PATENT DOCUMENTS

WO  WO 00/75082 A1  12/2000

* cited by examiner

Primary Examiner—Patrick Ryan
Assistant Examiner—Thomas H. Parsons
(74) Attorney, Agent, or Firm—Wolf, Greenfield & Sacks, P.C.

(57) ABSTRACT

An electrodeionization apparatus comprising an endblock formed from a resilient material, and method for making the same. The resilient material may include various types of thermoplastic elastomers, such as, styrene block copolymers, copolyesters, plolyurethanes, polyamides, thermoplastic elastomeric olefins, and thermoplastic vulcanizates. The resilient material may have a Shore A hardness of between about 40 and about 90.

38 Claims, 17 Drawing Sheets

ELECTRODEIONIZATION APPARATUS WITH RESILIENT ENDBLOCK

BACKGROUND OF THE INVENTION

1. Field of the Invention

The present invention relates to an electrodeionization apparatus and, more particularly, to an electrodeionization apparatus having an endblock formed of a resilient material.

2. Description of Related Art

Electrodeionization (EDI) is a process that may be used to purify water by removing ionizable species from liquids using electrically active media and an electrical potential to influence ion transport. The electrically active media may function to alternately collect and discharge ionizable species, or to facilitate the transport of ions continuously by ionic or electronic substitution mechanisms. EDI devices can include media having permanent or temporary charge and can be operated to cause electrochemical reactions designed to achieve or enhance performance. These devices also include electrically active membranes such as semi-permeable ion exchange or bipolar membranes.

Continuous electrodeionization (CEDI) is a process wherein the primary sizing parameter is the transport through the media, not the ionic capacity of the media. A typical CEDI device includes alternating cation-selective membranes and anion-selective membranes. The spaces between the membranes are configured to create liquid flow compartments with inlets and outlets. A transverse DC electrical field is imposed by an external power source using electrodes at the bounds of the membranes and compartments. These electrodes are typically supported by rigid endblocks formed of an inert material and a housing and/or endplates. Electrodeionization devices have been described by, for example, Giuffrida et al. in U.S. Pat. Nos. 4,632,745, 4,925,541 and 5,211,823, by Ganzi in U.S. Pat. No. 5,259,936, by Ganzi et al. U.S. Pat. No. 5,316,637, by Oren et al. in U.S. Pat. No. 5,154,809 and by Kedem in U.S. Pat. No. 5,240,579, which are incorporated herein by reference.

SUMMARY

The present invention is directed to an electrodeionization apparatus having at lease one end block formed of a resilient material.

In another embodiment, the electrodeionization apparatus comprises an ion-depleting compartment, an ion-concentrating compartment, and an endblock having a first surface adjacent an electrode and a second surface adjacent an endplate. The endblock is formed of a resilient material.

In another embodiment, the electrodeionization apparatus comprises at least one endplate encased in a resilient material.

BRIEF DESCRIPTION OF THE DRAWINGS

Preferred, non limiting embodiments of the present invention will be described by way of example with reference to the accompanying drawings, in which.

DETAILED DESCRIPTION

The present invention is directed to an electrodeionization apparatus including an electrode block, also known as an endblock, formed of a resilient material. As used herein, "resilient material" is defined as a material having the ability to recover its size and form following deformation. Traditional rigid endblocks typically provide support for an electrode and fluid flow within an apparatus given the normally high operating pressures. It is desirable that the endblock also provide electrical isolation between the electrode and a grounded endplate, and seals with a spacer gasket and with tie-bar sleeves to isolate the fluid compartments from the endplate, which is typically formed from a metal, and the working fluid in the apparatus from components that may not be compatible. A resilient endblock may provide integral fluid tight seals throughout the electrodeionization apparatus, thereby eliminating the use of separate seals such as o-rings and gaskets.

An electrodeionization apparatus or device may be based on technologies such as continuous electrodeionization, electrodiaresis, filled-cell electrodialysis, electrochemical ion exchange, capacitive deionization and the like. Moreover, an electrodeionization apparatus may be based on various configurations, such as a spiral design, as disclosed, for example, by Rychen et al., in U.S. Pat. No. 5,376,253, a plate and frame design as disclosed, for example, by DiMascio et al., in U.S. Pat. No. 5,858,191 and a circular design comprising electrically inert disk-shaped spacers having a central hub and upper and lower surfaces, as disclosed, for example, by Liang et al., in U.S. Pat. No. 5,292,422, each incorporated herein by reference in their entireties.

Figure 1:
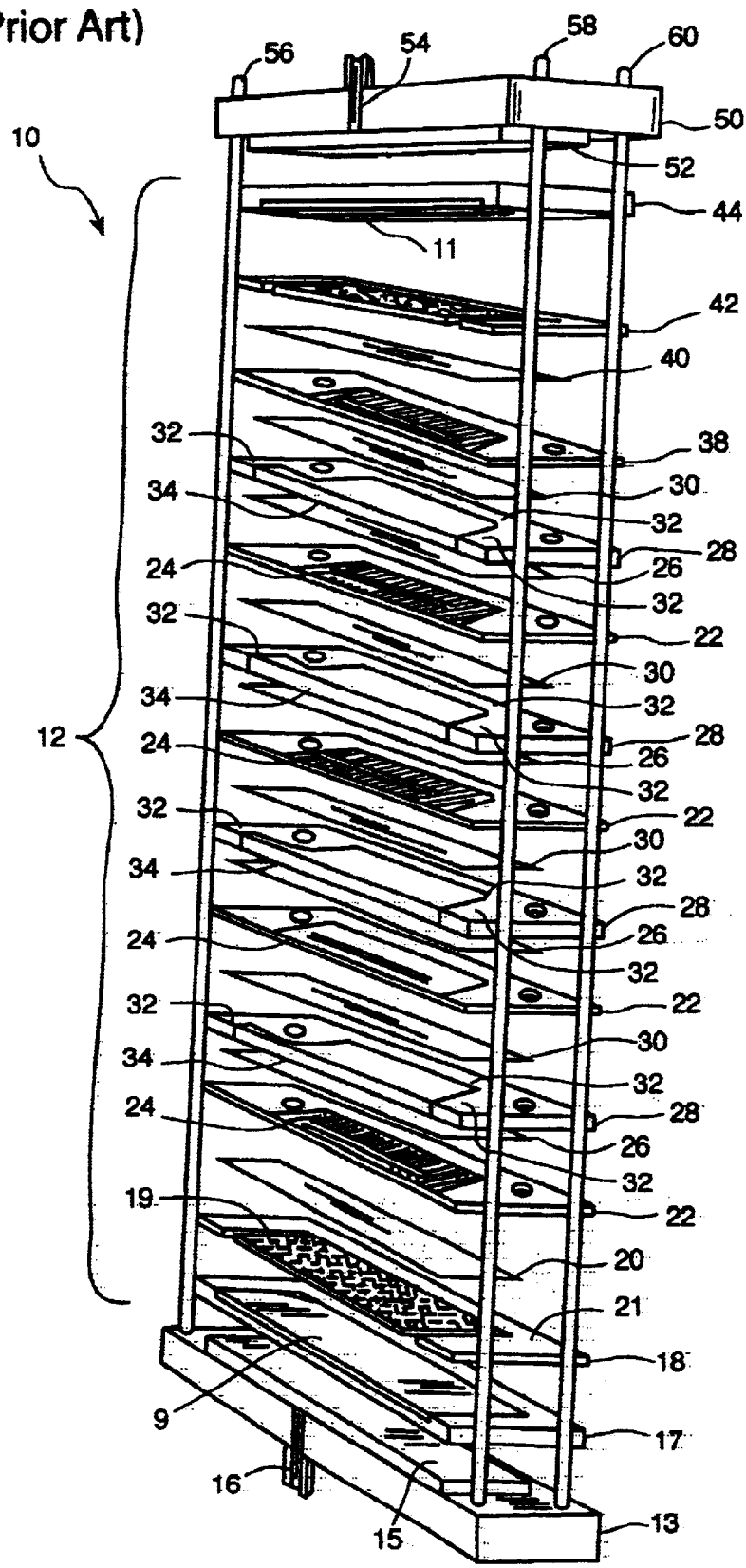
FIG. 1 is an exploded view of a conventional electrodeionization apparatus.

Referring to FIG. 1, a conventional electrodeionization apparatus 10 comprises one stage 12 bounded by electrode 9 and electrode 11. Adjacent to an end plate 13 is an endblock 17 to house electrode 9 and desired manifolding. An electrode spacer 18 is positioned adjacent to the endblock 17 and includes a screen 19 which effects turbulent flow of liquid passing through the electrode spacer 18. An ion permeable membrane 20 is sealed to the periphery 21 of electrode spacer 18. Spacers 22 formed of flexible material include a screen 24. The spacers and screens 24 plus ion exchange membranes comprise the concentrating compartments of the electrodeionization apparatus.

The depleting compartment structures comprise an ion permeable membrane 26, a spacer formed of rigid material 28 and ion permeable membrane 30. The ion permeable membranes 26 and 30 are sealed to the periphery 32 of the spacer 28 on opposite surfaces of the spacer 28. Ion exchange resin beads 34 are housed within a central space which includes ribs (not shown) and are retained therein by membranes 26 and 30. Liquid to be purified within a stage 12 is passed through at least one unit comprising spacers 22 and 28 and membranes 26 and 30. The units which comprise spacers 22 and 28 and membranes 26 and 30 are repeated usually between 5 and 250 times in order to provide a reasonable liquid flow-through capacity in the stage 12. A spacer 38 formed of flexible material and screen 24 plus an ion exchange membrane 40 form the end concentrate compartment. An electrode spacer 42 is positioned adjacent the endblock 44 housing electrode 11. End plate 50 is positioned adjacent to the endblock electrode assembly on the side opposite that adjacent to the electrode spacer 42. Tie-bars 56, 58 and 60 as well as a fourth tie-bar (not shown) extend along the entire length of the apparatus 10 to retain the apparatus elements in place. Expandable bladders 15 and 52 can be expanded by passing fluid through inlets 16 and 54, respectively.

Figure 2:
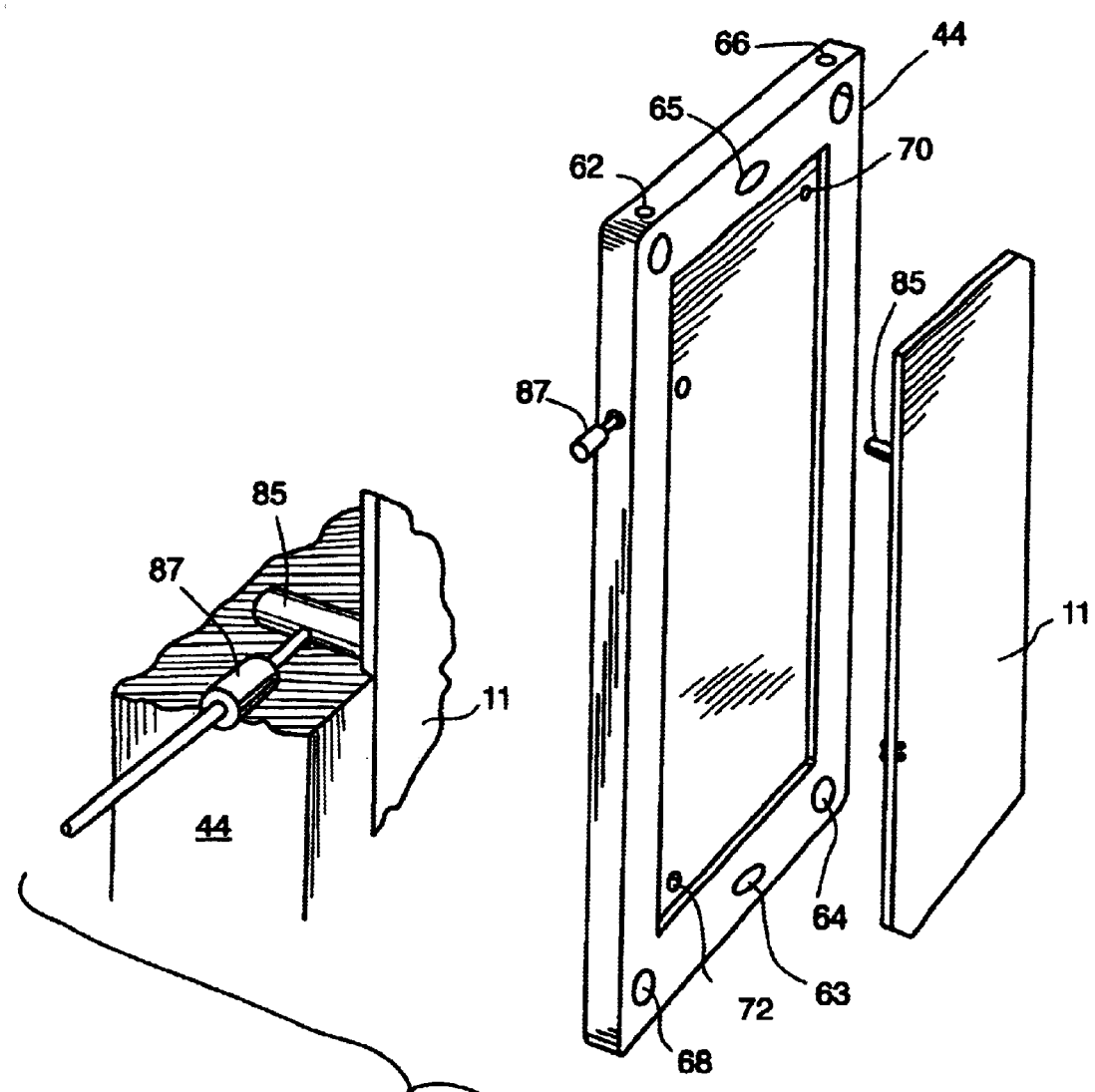
FIG. 2 is a schematic view of a conventional endblock and electrode.

Referring to FIG. 2, a conventional endblock 44 is show in an exploded view with an electrode 11. The endblock 44 is provided with electrolyte feed inlet 70 and electrolyte waste outlet 72. Electrode 11 includes a connector 85 which contacts the exterior electrical connection 87 as shown in the detail portion of FIG. 2. The endblock 44 includes an inlet 62 and outlet 64 for depletion compartments and inlets 65 and 66 and outlets 63 and 68 for concentration compartments.

Conventional rigid endblocks are typically constructed of a solid dielectric material, which may be a glass, ceramic, a fused silica, or a rigid organic polymer such as polyvinylchloride, high density polyethylene, polycarbonate, polypropylene, structural foamed polypropylene, glass-reinforced polypropylene, polysulfone, polystyrene, polybutadiene, melamine, a poly (phenol-formaldehyde) resin, a PTFE, or a PEEK. The rigid endblocks are typically cut from large sheets of the rigid material and further machined for surface finish. Passageways are also typically machined in the rigid endblock for placement of tie-bars. Because conventional endblocks are rigid, sealing rings are typically positioned around each passageway to prevent fluid that may leak from the ion-depleting or ion-concentrating compartments from causing an electrical short. Threaded passageways are also typically machined to provide connections to inlet and outlet fittings which also commonly include the use of individual gaskets when making a connection to corresponding external piping. An additional passageway may also be machined to receive an electrode connection.

Figure 3:
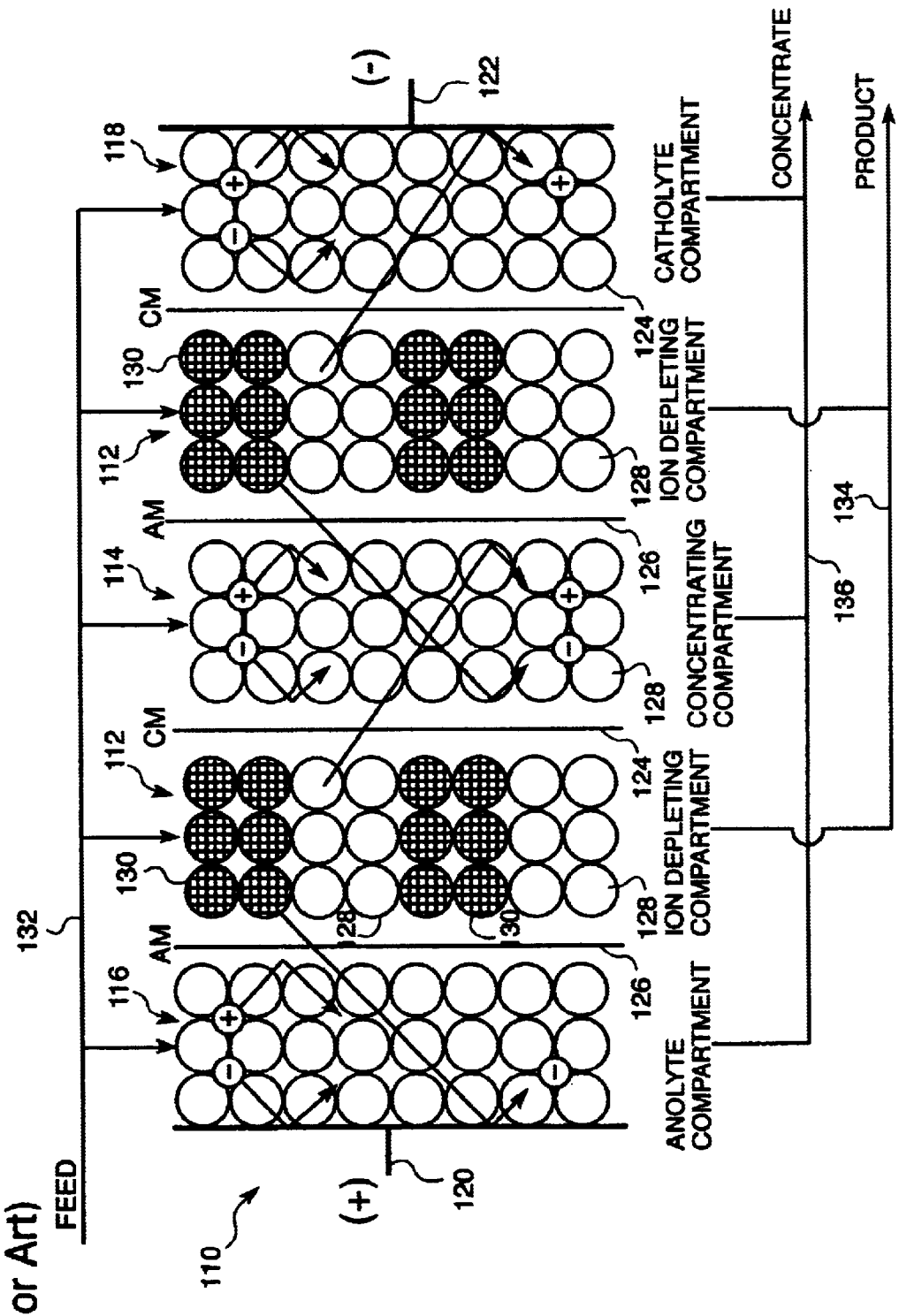
FIG. 3 is a schematic, sectional view through one embodiment of a conventional electrodeionization apparatus illustrating the fluid and ion flow direction through an ion-depleting, ion-concentrating and electrolyte compartments.

In FIG. 3, a schematic, cross-sectional view of the fluid and ion flow paths through a conventional electrodeionization apparatus or module is shown. The electrodeionization apparatus 110 comprises at least one ion-depleting compartment 112 and at least one ion-concentrating compartment 114. The ion-depleting compartments are typically bordered by an anolyte compartment 116 and a catholyte compartment 118. Endblocks (not shown) are positioned adjacent to endplates to house an anode 120 and a cathode 122 in their respective compartments. The compartments are typically bordered by cation-selective membranes 124 and anion-selective membranes 126, which are typically sealed to the periphery of both sides of the compartments. The cation- and anion-selective membranes are typically heterogeneous polyolefin-based membranes, which are typically extruded by a thermoplastic process using heat and pressure to create a composite sheet.

Electroactive media is typically housed within a central space between the ion-permeable membranes 124 and 126. The ion-concentrating compartments are typically filled with cation exchange resins 128, layered cation and anion exchange resins (not shown) or mixed anion and action exchange resins (not shown). The ion-depleting compartments are typically filled with alternating layers of a cation exchange resin 128 and an anion exchange resin 130, or mixed anion and cation exchange resins (not shown).

A liquid to be purified may be passed through at least one cell pair in the electrodeionization apparatus comprising an ion-depleting compartment 112 and ion-concentrating compartment 114. Alternatively, an electrodeionization apparatus may comprise one or a plurality of stages. Preferably, in each stage, an anode is positioned at an opposite end of a stack of depleting and concentrating compartments from an end at which a cathode is positioned. Each anode and cathode may be formed from a conductive material and provided with an ion-permeable membrane and an endblock. The remaining portion of each stage may comprise a series of alternating ion-depleting and ion-concentrating compartments. Notably, other arrangements besides alternating ion-depleting and ion-concentrating compartments are contemplated. For example, each stage may comprise a series or pairs of alternating ion-depleting and ion-concentrating compartments so that two ion-depleting compartments may be placed adjacent and surround an ion-concentrating compartment or two or more adjacent ion-concentrating compartments may border two or more ion-depleting compartments.

The liquid, typically feed water, to be purified or depleted of ions or ionizable species can be passed in parallel through each ion-depletion compartment in each stage to remove ions into a second liquid in the ion-concentrating compartments. The direction of flow within the ion-depleting compartments can be in the same direction or in an opposite direction to the flow in an adjacent compartment or ion-concentrating compartment. If pluralities of stages are utilized, the liquid removed from the ion-depleting compartments in an upstream stage can be directed in series into the ion-depleting compartments in the next or any adjacent downstream or upstream stage. Alternatively, the liquid can be directed in a counter flow arrangement in ion-depleting compartments comprising a second or any subsequent stage.

In typical operation, a feed liquid 132 to be purified, typically having dissolved, dissolvable or ionizable cationic or anionic components or species, is fed through the ion-depleting compartments 112, wherein the cationic components are attracted to the cation exchange resin 128 and the anionic components are attracted to the anion exchange resin 130. Preferably, an electric field is applied through the electrodes 120 and 122 at the opposite ends of the module. The electric current typically passes perpendicular to the fluid flow such that the dissolved cationic or anionic components migrate from the ion exchange resin layers in the direction of their corresponding attracting electrode. Cationic components typically migrate through the cation-selective membrane 124 into the adjacent ion-concentrating compartment 114. An anion-selective membrane 126, typically on the opposite side of the ion-concentrating compartment, prevents or inhibits further migration, thereby trapping the cationic components in the ion-concentrating compartment.

The transport process for the anionic components is analogous but occurs in the opposite direction. Typically, anionic components migrate through an anion-selective membrane into the ion-concentrating compartment and a cation-selective membrane, typically on the other side of the ion-concentrating compartment, prevents or inhibits further migration of these ionic components and thereby trapping them in the ion-concentrating compartment. As the liquid flows through the module, ionic components are further depleted from the ion-depleting compartments and increased in the ion-concentrating compartments; thus, a high purity, product stream and a concentrate stream are produced.

Figure 4:
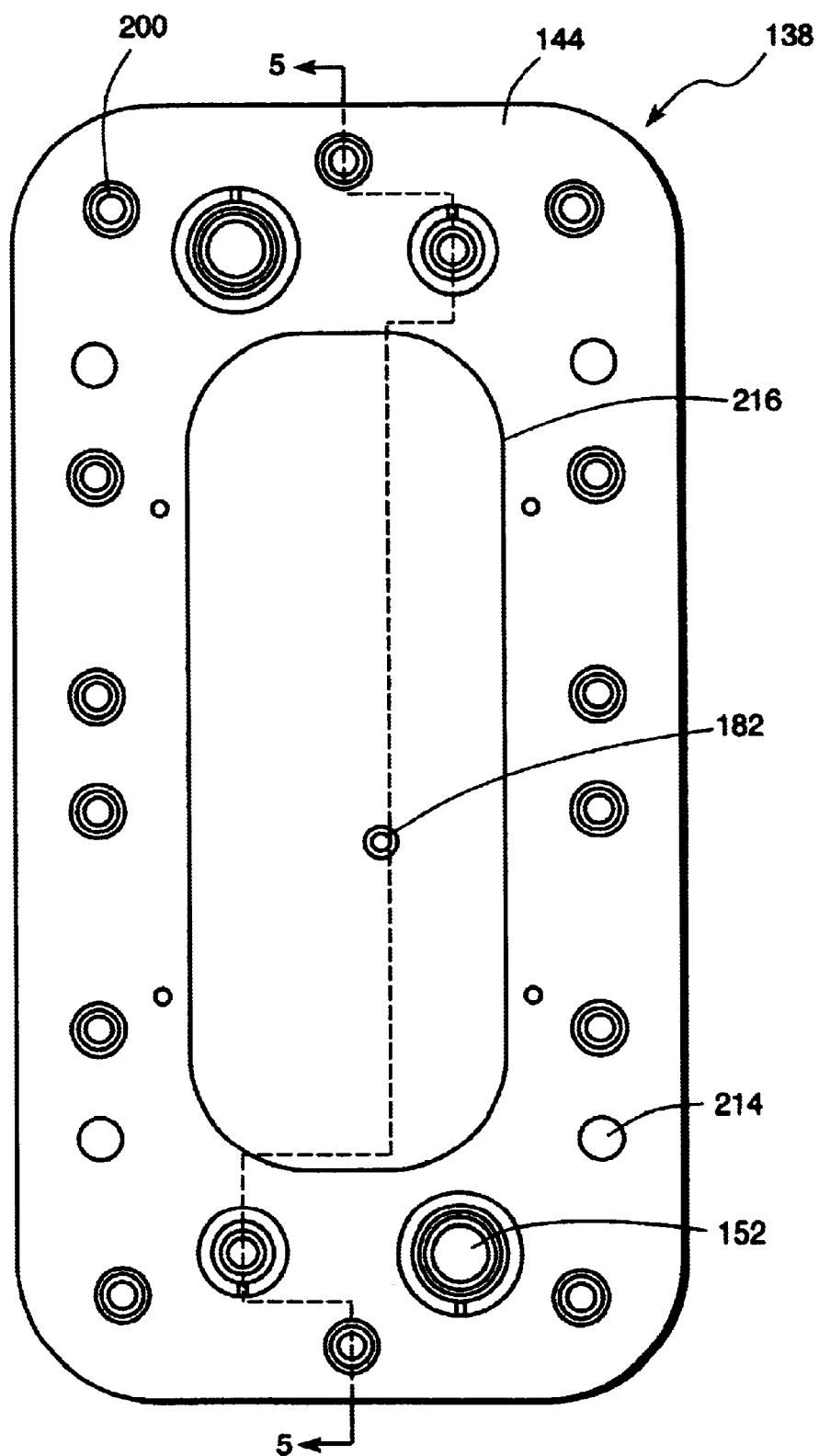
FIG. 4, is a schematic view of one embodiment of the endblock of the present invention.
Figure 5:
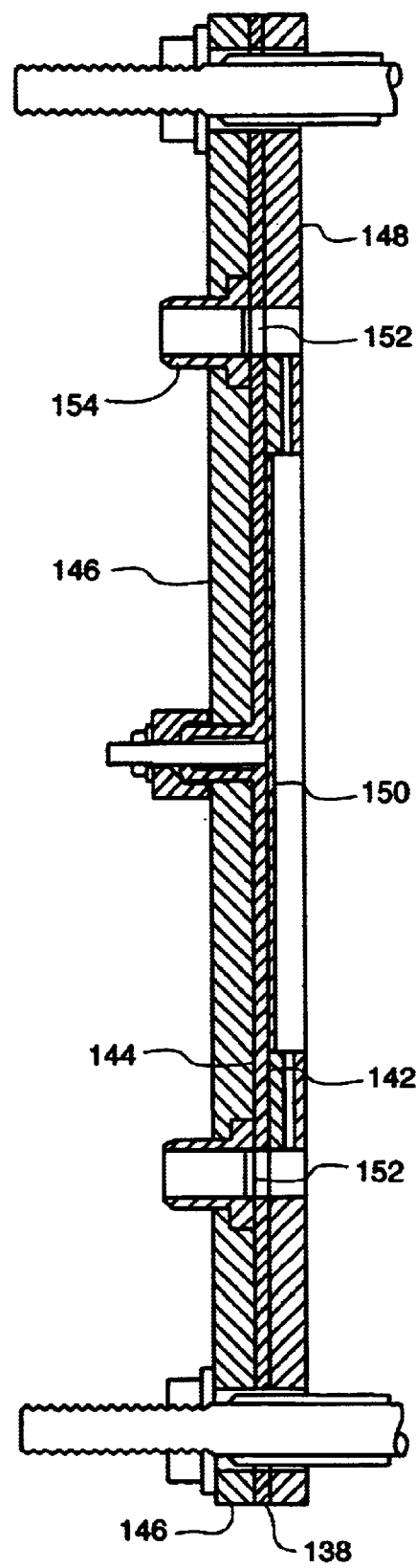
FIG. 5 is a cross-sectional side view along line 5 of the endblock of FIG. 4.
Figure 6:
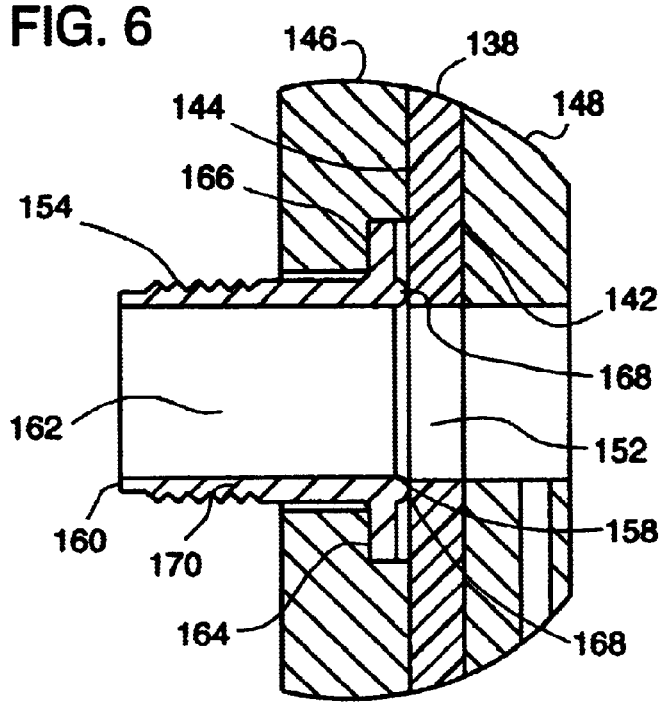
FIG. 6 is a cross-sectional view of one embodiment of a seal between a connector fitting and endblock of the present invention.

FIGS. 4–6 show one embodiment of an endblock of the present invention. Endblock 138 comprises a first surface 142 and a second surface 144. When assembled in an electrodeionization apparatus, the first surface 142 of the endblock contacts spacer 148 and electrode 150, and the second surface 144 of the endblock contacts endplate 146. Spacer 148 surrounds outer periphery of electrode 150 to provide a fluid compartment. The endblock may be made of any resilient material that is compatible with the fluid streams in the electrodeionization apparatus. In addition, the resilient material typically may be molded into particular sizes and shapes for supporting an electrode and various fittings in an electrodeionization apparatus. Examples of resilient materials include, but are not limited to, various types of thermoplastic elastomers, such as, styrene block copolymers, copolyesters, polyurethanes, polyamides, thermoplastic elastomeric olefins, and thermoplastic vulcanizates. Some commercially available thermoplastic elastomers which may be useful in the present invention include, but are not limited to, SOFTFLEX® resin (Network Polymers, Inc., Akron, Ohio), STARFLEX® resin (Star Thermoplastic Alloys & Rubber, Inc. (Glen View, Ill.), VERSALLOY® XL9000 resin (GLS Corporation, McHenry Ill.), MORTHANE® resin (Rohm and Haas, Philadelphia, Pa.), ESTANE® resin (B F Goodrich, Cleveland, Ohio), and SANTOPRENE® resin (Applied Elastomer Systems, Akron, Ohio). In a preferred embodiment, the endblock is made of a SANTOPRENE® blend of ethylene propylene diene rubber and polypropylene. In one embodiment, the resilient material has a Shore A Harness of about 40 to about 90, preferably from about 50 to about 80, and more preferably from about 60 to about 75, as determined by test method TPE-0169 (ASTM D 2240). It is desirable that the hardness be sufficiently high to prevent flow of the molded endblock while under pressure. If the hardness is too low the endblock may be susceptible to compression set, which may lead to a broken seal if, for example, a component shifts during transport or use of the electrodeionization apparatus. Alternatively, if the hardness is too high, the endblock may not compress enough to form a fluid tight seal. In addition to hardness, it is also recognized that polymer resin additives, such as but not limited to plasticizers, may be used to obtain and maintain a desired resilience and flexibility. Depending on the fluid to be purified, it may be desirable to use an endblock material approved by the Food and Drug Administration for use in food or pharmaceutical applications and/or by the National Sanitation Foundation for use with potable water.

Endblock 138 may be molded in any suitable thickness, dimensions, and shape, for a particular electrodeionization apparatus application. For example, the endblock may be circular to coincide with a circular endplate as described in U.S. Provisional Application Serial No. 60/329,296 titled Electrodeionization Apparatus and Methods of Manufacture and Use Thereof, filed Oct. 15, 2001, incorporated herein by reference in its entirety. The thickness is typically determined by the parameters of the molding process, the mechanical requirements of the endblock, and the resilient material's ability to form a seal at a given thickness. The thickness may vary from about 0.06 inch to about 2 inches. In one embodiment, the thickness is less than about 0.75 inch. In another embodiment, the thickness is less than about 0.50 inch; preferably less than about 0.25 inch; more preferably, less than about 0.18 inch; and most preferably, less than about 0.12 inch.

As seen in FIGS. 4–10, the endblock 138 may comprise a plurality of passageways 152, 182, 200, and 214 extending from the first surface 142 to the second surface 144. FIG. 5 shows endblock 138 comprising a plurality of passageways 152 providing fluid communication between an adjacent fluid compartment and an inlet/outlet connector fitting 154. Fluid tight connections, or seals, are desirable for preventing fluid leaking from compartments from contacting electrical components. Connector fitting 154 may by made of any rigid material suitable for making fluid connections to a point of use or a point of entry into the electrodeionization apparatus. For example, the connector fitting may be a metal, plastic, glass-filled plastic, mineral-filled plastic, structural foam plastic, or combinations thereof. Examples of polymeric materials include, but are not limited to, polysulfone, polyphenylsulfone, polyphenylene oxide, polyphenylene ether, chlorinated poly(vinyl chloride), polyphenylene sulfide, polyetherimide, polyetherketone, polyamide-imide and polybenzimidazole and mixtures thereof. One commercially available material that is suitable for use as a connector fitting is RADEL® R-5100 polyphenylsulfone from Solvay Engineered Polymers (Auburn Hills, Mich.). The connector fitting may be machined from solid metal rods, cast or molded. In one embodiment, the rigid material of connector fitting 154 is compatible with the fluid being treated. In a preferred embodiment, the connector fitting is molded glass-filled polypropylene.

The overall shape of connector fitting 154 may vary depending on the type of connection desired in a particular application. One embodiment of connector fitting 154, shown in FIG. 6, comprises a first end 158, a second end 160, and an orifice 162 extending from the first end 158 to the second end 160. Connector fitting 154 may be configured to connect, for example, with external piping having a complementary connection. For example, connector fitting 154 may include a parallel or tapered side wall 170. An external or internal surface of wall 170 may be threaded or otherwise configured to mate with a corresponding threaded connection. In another embodiment, connector fitting 154 may be a flange or sanitary fitting.

Figure 7:
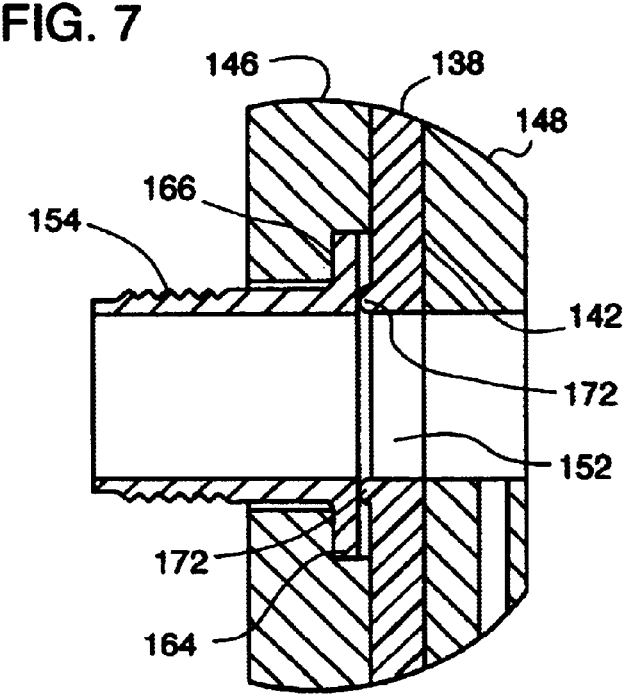
FIG. 7 is a cross-sectional view of another embodiment of a seal between a connector fitting and endblock of the present invention.

As seen in FIG. 6, connector fitting 154 may also include a flange 164 extending outward from the first end 158 to engage lip 166 of endplate 146 when the connector fitting is installed between endplate 146 and endblock 138. Flange 164 may also have protrusion 168 surrounding connector fitting orifice 162, which compresses endblock 138 when the connector fitting is installed between endplate 146 and endblock 138, thereby forming a fluid tight seal with endblock 138. Alternatively, FIG. 7 shows a cross sectional view of another embodiment of a seal between connector fitting 154 and endblock 138. As shown in FIG. 7, flange 164 may contact a protruded periphery portion 172 adjacent passageway 152 of endblock 138, which compresses against flange 164 when assembled. Other fluid tight seals are also contemplated, such as for example, a protrusion 168 on flange 164 or endblock 138 that mates with a corresponding groove (not shown) in endblock 138 or flange 164.

Also as seen in FIG. 4, the endblock 138 may comprise one or more passageways 214 positioned outside a seal area of the endblock. Components of the electrodeionization device, such as electrical connections, may be positioned within the passageway. In a preferred embodiment, the first surface and the second surface of the endblock adjacent the one or more passageways may be flush with the respective surfaces because fluid tight seals are not necessary outside the seal area.

Figure 8:
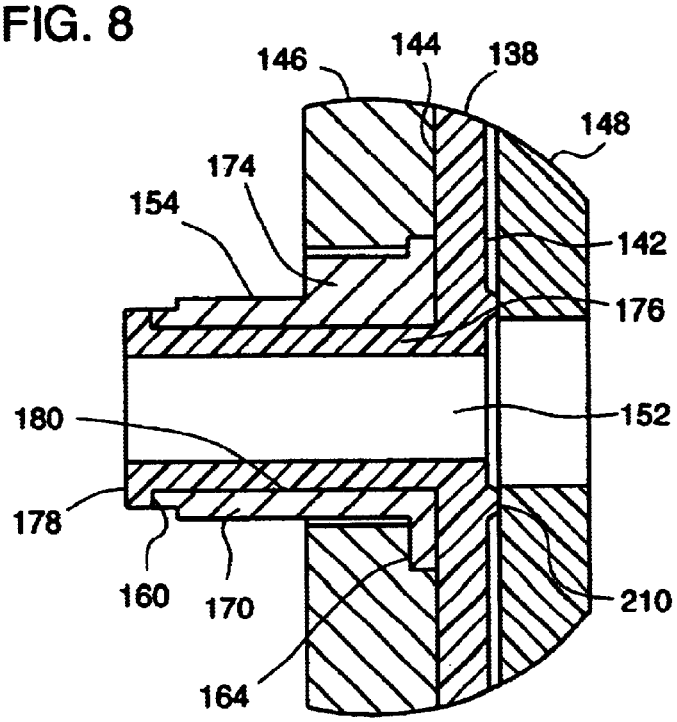
FIG. 8 is a cross-sectional view of one embodiment of an endblock of the present invention having an overmolded connector fitting.

FIG. 8 is a cross-sectional view of a preferred embodiment of an endblock of the present invention having an insert molded or overmolded connector fitting. Endblock 138 comprises protruded periphery portion 176 adjacent passageway 152, extending from second surface 144 of endblock 138 and contacting interior surface 180 of sidewall 170 connector fitting 154. Protruded periphery portion 176 may extend beyond the second end 160 of connector fitting 154, and outwardly against the second end of the connector fitting, forming a lip 178, that acts like a gasket when the fitting is mated with an exterior connection. Lip 178 may contact and/or be bonded to, the entire surface of second end 160, or alternatively only a portion of the surface. Alternatively, lip 178 may also include a first protrusion (not shown) extending outward and/or a second protrusion extending into a complementary groove on the second end 160 of the connector fitting. The first surface 142 of endblock 138 may also include protrusion 210 adjacent the passageway 152, which compresses against concentrate spacer 148 when assembled. Because lip 178 and protrusion 210 are part of and integral to the endblock 138, the use of individual seals, such as, gaskets and/or o-rings, used with conventional endblocks may be eliminated. The elimination of individual seals simplifies assembly by reducing handling during manufacture and parts inventory and labor costs associated with the manufacture of electrodeionization devices. In addition, because the integrally molded lip 178 and protrusion 210 remain in position during assembly, they may provide a tighter seal than individual gaskets and o-rings.

In a preferred embodiment, connector fitting 154 is insert molded or overmolded during the endblock molding process. In this process, the connector fitting is first fabricated separately. Fabrication methods may include injection molding, for example, if the fitting material is a polymer, or machining, for example, if the fitting material is a metal. The fitting, also called a "preform," is then positioned in an endblock mold before the resilient material is injected into the mold at elevated temperature and pressure. This results in the resilient material forming and curing around desired surfaces of the connector fitting, such as, fluid contacting surfaces. Because the endblock material may cover the internal wall of the connector fitting, the connector fitting may be formed of any structurally appropriate material, regardless of its compatibility with the fluid to be treated in the electrodeionization apparatus. In a preferred embodiment, the connector fitting may be formed of a desirable structurally sound material such as, but not limited to a glass-filled polypropylene, because the potential for glass fibers contaminating the fluid being treated is reduced or eliminated by overmolding the connector fitting.

In the overmolding process, the resilient material forming the endblock and the connector fitting materials may be chosen for their compatibility. If the insert and resilient materials are compatible, a thermal and/or chemical bond will occur at an interface between the two materials. Bonding may be improved by preheating the insert prior to placement in the endblock mold. In preferred embodiment, a blend of ethylene propylene diene and polypropylene is overmolded on a glass filled polypropylene connector fitting providing a bond between the connector fitting and the endblock. Without being bound to a particular theory, it is believed that localized fusion occurs between the connector fitting and endblock materials. It is theorized that the glass at the surface of the interior wall of the connector fitting provides an increased surface area for bonding with the endblock material. The bond between the connector fitting and endblock material provides a fluid tight seal and prevents the connector fitting from slipping while attaching external connections. In a another embodiment, also as shown in FIG. 8, connector fitting 154 further includes a tab 174, extending from flange 164 toward second end 160. Tab 174 is positioned within a corresponding recess in endplate 146 when assembled, and may provide torque resistance to connector fitting 154, for example, while external piping is being connected. Tab 174 may, but need not be, integral to the preformed connector fitting.

If the insert and resilient materials are not compatible, then an adhesive and/or primer may be applied to the surface of the insert prior to positioning in the endblock mold to ensure an acceptable bond between the insert and the resilient material. Alternatively, the insert can be designed with surface features such as tabs, grooves or slits to ensure a mechanical lock between the insert and the resilient material.

In another embodiment, not shown, the preformed connector fitting may be inserted onto the protruded periphery portion of a preformed endblock. In this embodiment, a structure is desired to provide torque resistance between the unbonded connector fitting and endblock. The structure may take the form of a projection from the connector fitting which fits into a corresponding depression in the protruded periphery portion of the endblock. Alternatively, a projection on the protruded periphery portion of the endblock may fit into a corresponding depression in the connector fitting.

Figure 9:
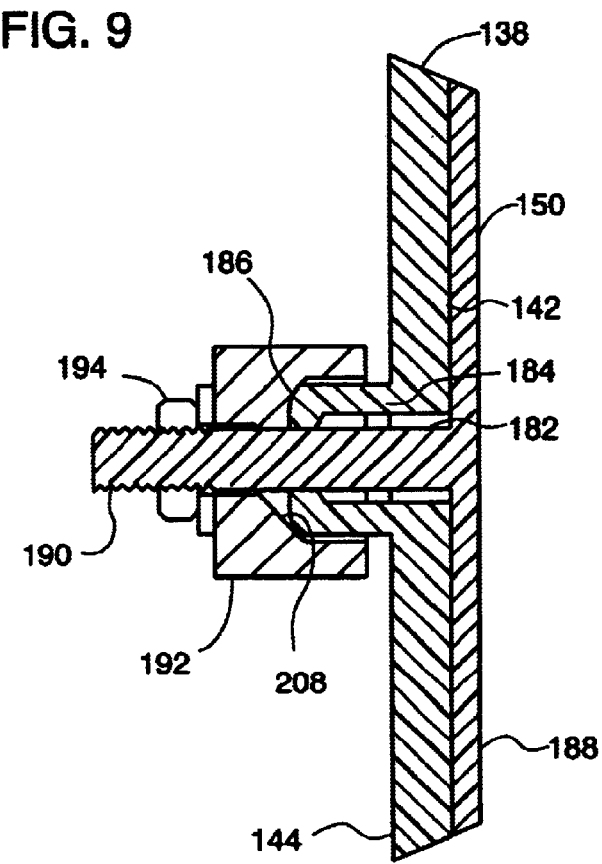
FIG. 9 is a cross-sectional view of one embodiment of a seal between an electrode connection and endblock of the present invention.

FIG. 9 is a cross-sectional view of one embodiment of a seal between an electrode connection and endblock of the present invention. In a preferred embodiment, the first surface 142 of endblock 138 comprises a contoured recess (not shown) to house the electrode 150. The contour of the recess may complement that of electrode 150 to partially or completely house the electrode. As shown in FIG. 4, the second surface 144 of the endblock, may comprise a corresponding contoured protrusion 216 (not shown) that profiles the contoured recess of the first surface. In this embodiment, the contoured protrusion 216 may be housed in a corresponding contoured recess (not shown) of endplate 146.

As shown in FIG. 9, endblock 138 comprises a passageway 182 extending from the recess through the body to the second surface of the endblock, to receive electrode connection 190 that extends from electrode 188. Endblock 138 may include a protruded periphery portion 184 adjacent passageway 182 which may also include a lip 186 extending inward to the electrode connection 190. The first surface 142 may also have a recessed periphery portion (not shown) adjacent passageway 182 which provides a seal between the endblock 138 and electrode connection 190. In addition to, or instead of, the recessed periphery portion (not shown) of the first surface, the second surface may have a recessed periphery portion adjacent the passageway 182. The recessed periphery portions on the first surface and on the second surface may result in a seal forming with the electrode connection. In a preferred embodiment, a collar 192 having an internal taper 208 may be used to compress lip 186 against electrode connection 190. Collar 192 may be tightened by mechanical means, such as, nut 194 on electrode connection 190. Other mechanisms for compressing lip 186 to electrode connection 190 are also contemplated, for example, clamps, fasteners, retaining rings, and worm clamps.

Figure 10:
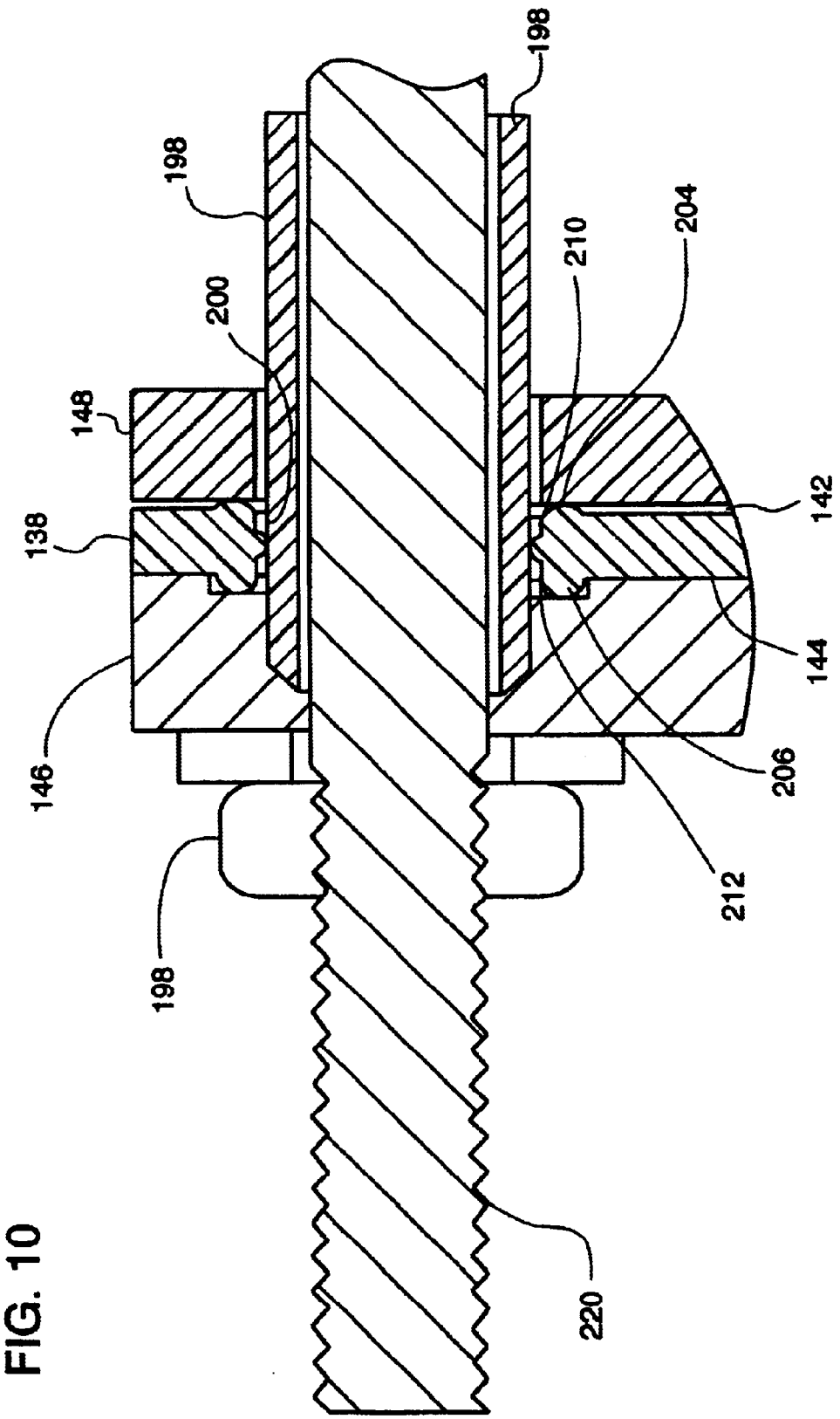
FIG. 10 is a cross-sectional view of one embodiment of a seal between a tie-bar sleeve and endblock of the present invention.

FIG. 10 is a cross sectional view of one embodiment of a seal between a tie-bar 220 positioned in a tie-bar sleeve 198 and the endblock of the present invention. As is known in the art, tie-bars are used to compress and secure the components of an electrodeionization apparatus. It may also be desirable to sheath the tie bar in a non-conductive sleeve and to provide fluid tight seals around the sleeve to prevent fluid that may leak from the fluid compartments particularly, for example, from contacting electrical connections. In one embodiment of the present invention, endblock 138 comprises a passageway 200 extending through the endblock, from the first surface 142 to the second surface 144. The first surface 142 may have a recessed periphery portion 210 adjacent at least one passageway 200. In addition to, or instead of, the recessed periphery portion of the first surface, the second surface 144 may have a recessed periphery portion 212 adjacent the at least one of the plurality of passageways 200. The recessed periphery portions on the first surface and on the second surface may result in a seal forming with the tie-bar sleeve 198. The first surface 142 of endblock 138 may also include a protruded periphery portion 204 adjacent at least one of the plurality of passageways 200 extending toward spacer 148. The second surface 144 may also include a protruded periphery portion 206 adjacent at least one of the plurality of passageways 200 extending toward endplate 146. In a preferred embodiment, endblock 138 includes recessed periphery portions 210, 212 and protruded periphery portions 204, 206, adjacent the at least one of the plurality of passageways, which compress against respective adjacent surfaces providing fluid tight seals with the tie-bar sleeve, spacer, and endplate. It is contemplated that the tie-bars may have any shape suitable for the desired application, for example, cylindrical or rectangular rods. As shown in FIG. 5, a plurality of tie bars are used in an electrodeionization apparatus.

In addition, it is contemplated that any combination of passageways shown in FIGS. 4–10 as described herein may be utilized in the endblock of the invention. For example, in one embodiment shown in FIG. 11, endblock 138, housing an electrode (anode), comprises a passageway 182 for receiving electrode connection 190 and a plurality of passageways 200 for receiving tie-bars positioned in the tie-bar sleeves. The endblock 138 housing a counter electrode (cathode) comprises a passageway 182 for receiving electrode connection 190, a plurality of passageways 200 for receiving tie bars, as well as at least two passageways 152 for at least one inlet and at least one outlet for the electrodeionization apparatus as shown in FIG. 4.

Figure 11:
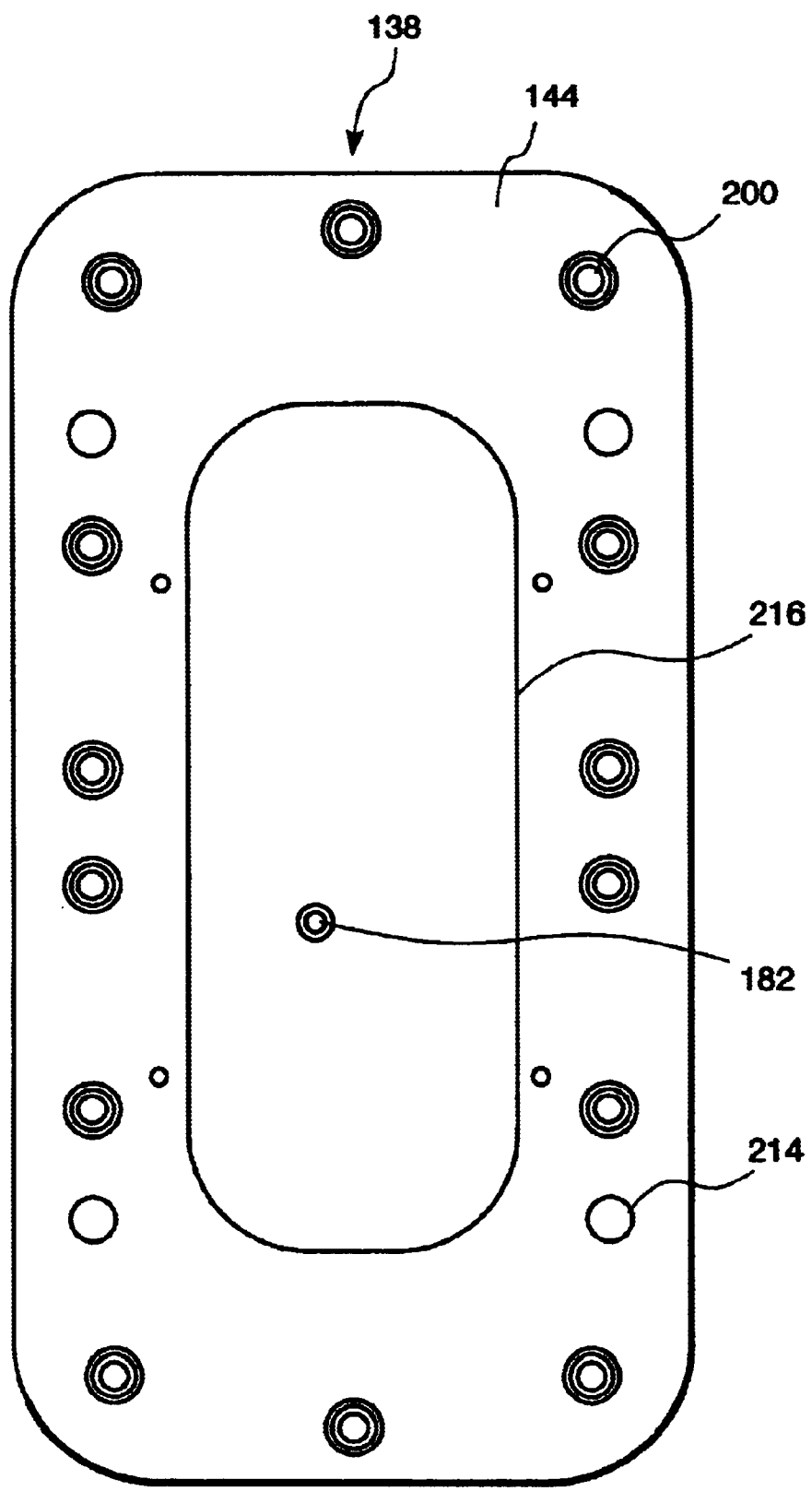
FIG. 11 is a schematic view of another endblock of the present invention.
Figure 12:
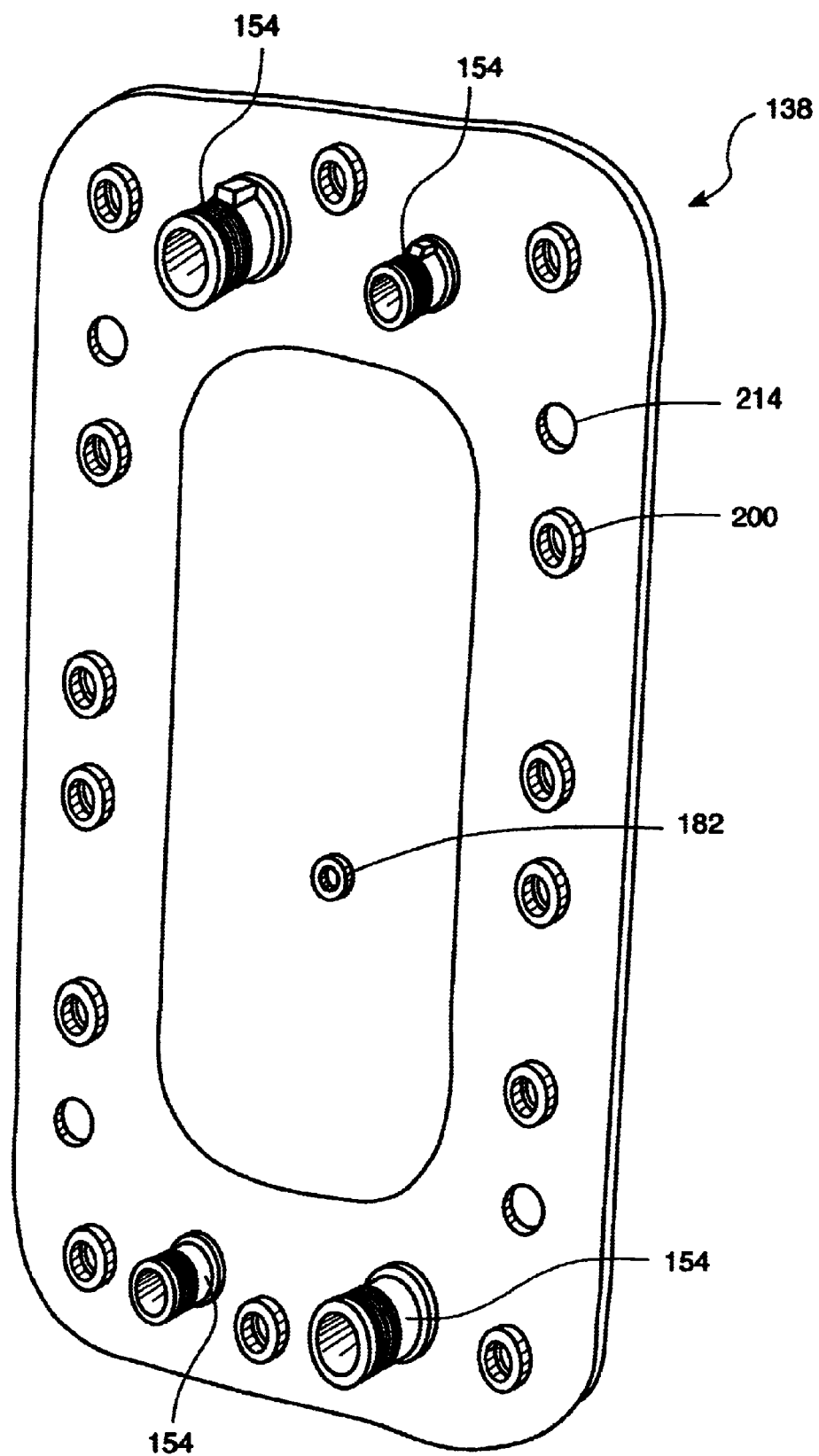
FIG. 12 is a perspective view of the endblock of FIG. 4.
Figure 13:
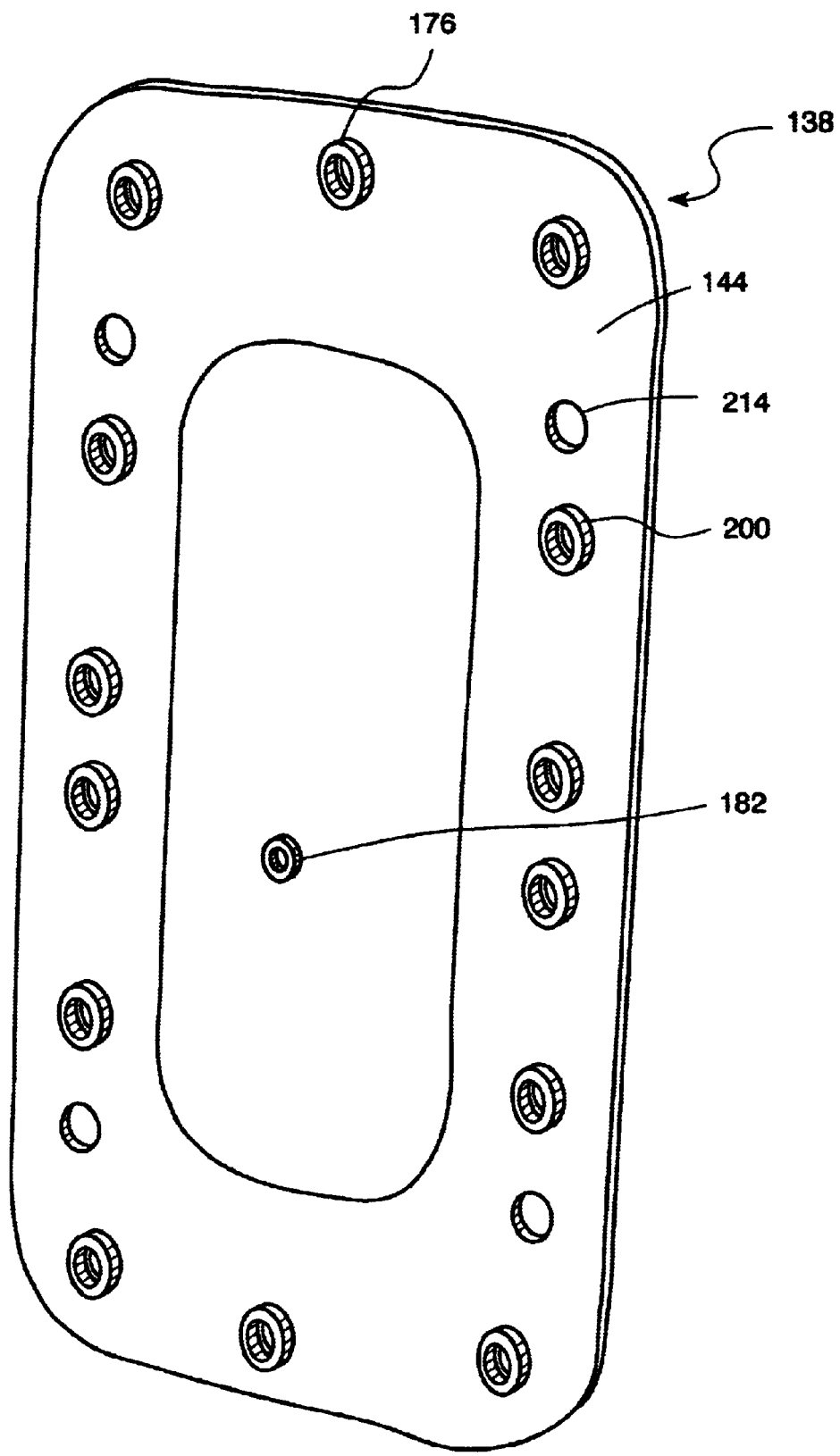
FIG. 13 is a perspective view of the endblock of FIG. 11.

FIG. 12, a perspective view of the endblock of FIG. 4, shows a plurality of protruded periphery portions adjacent passageways 182 and 200, as well as fitting 154 adjacent the inlets/outlets. FIG. 13, a perspective view of the endblock of FIG. 11, shows a plurality of protruded periphery portions adjacent passageways 182 and 200.

In another embodiment of the present invention, an endplate is overmolded with the resilient material resulting in a combined endblock and endplate. The endplate may be completely overmolded or covered with the resilient material. Alternatively, the endplate may be partially overmolded, for example, on one side and/or with passageways that are also overmolded to isolate the endplate from the working fluid. The endplate may be formed of structural materials, such as, metal and polymeric materials including, but not limited to, polypropylene, polyethylene, polycarbonate, nylon, polyacryletherketone (PEEK), styrene-acrylonitrile (SAN), polyphenylsulfone (PPS), cyclic olefin copolymer (COC), polyimide, and polyphenylene ether and its alloys. One commercially available polymeric material suitable for use as an endplate is RADEL® R-5100 polyphenylsulfone resin (available from Solvay). Other commercially available polymeric materials suitable for use as an endplate are NORYL® 731 polyphenylene ether resin and NORYL® PX1404 polyphenylene ether resin (available from GE Plastics). The material may be directly injected molded to form an endplate. Alternatively, the material used to form the endplate may be compounded with fillers to increase their mechanical and/or thermal properties, or to impart desired properties for specific applications. Examples of fillers include, but are not limited to, long strand glass fiber, short strand glass fiber, glass beads, talc, calcium carbonate, carbon and mineral oil. Other material suitable for forming endplates include fiberglass and thermoset resins. A fiberglass endplate may be formed, for example, by hand laid-up techniques or by spraying the fiberglass into a mold. Thermoset resins may also be compounded with various fillers to impart the desired properties for the specific application.

Figure 14:
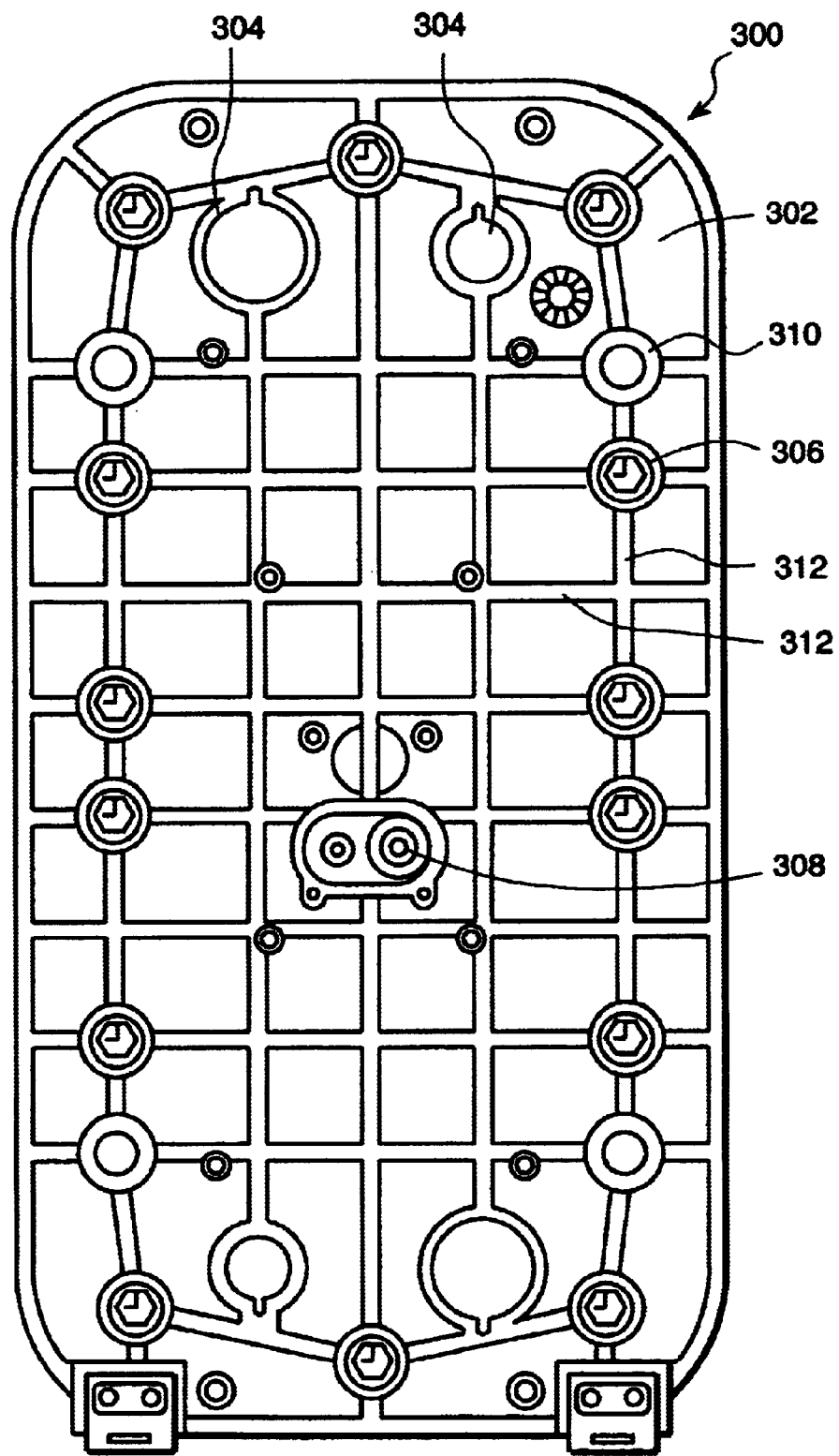
FIG. 14 is a schematic view of one side of a conventional endplate.
Figure 15:
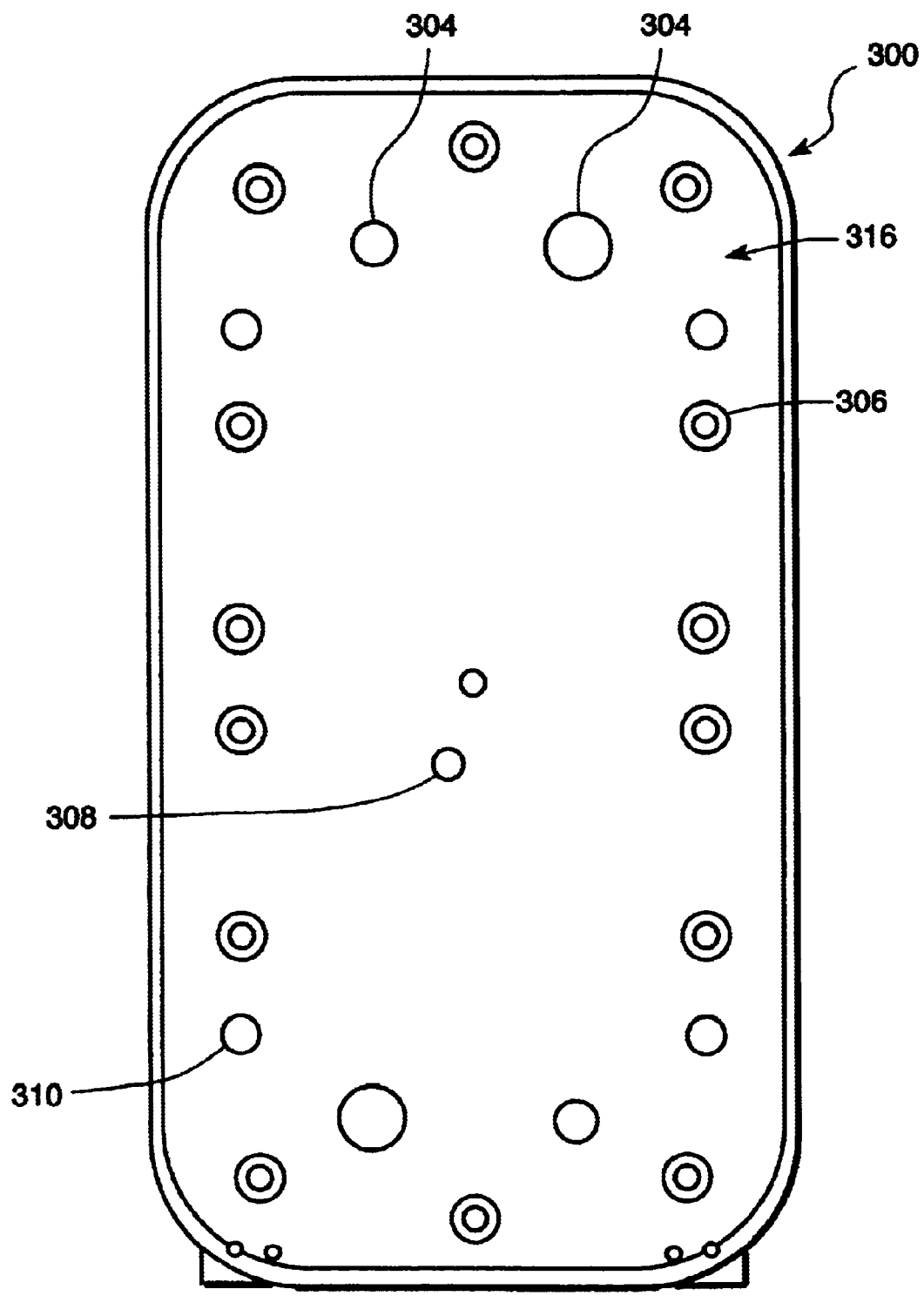
FIG. 15 is a schematic view of the opposite side of the endplate of FIG. 14.

FIGS. 14 and 15, show opposite sides of one embodiment of a conventional endplate 300 that may be overmolded with a resilient material. In one embodiment, the thickness of the resilient material molded onto the endplate may range from about 0.06 inch to about 2 inches. It is desirable that the thickness of the molded resilient material on the endplate be sufficient to withstand impact without significant damage, such as scratches during handling or use. The thickness of the resilient material on the endplate may vary depending upon position on the endplate. For example, the resilient material on a surface of the endplate contacting the electrode may be thicker than that positioned on an opposite surface or on a passageway.

Endplate 300 comprises a first side 316 facing an electrode as shown in FIG. 15, a second side 302 shown in FIG. 14, and a plurality of passageways 304, 306, 308, and 310 extending from the first side to the second side. Passageways 304 provide fluid communication between an adjacent fluid compartment and an inlet/outlet to the electrodeionization apparatus. Passageways 306 receives tie-bars, and passageway 308 receives an electrode connection. Passageways 310 provide access for passing component connections outside a fluid seal area. Endplate 300 also comprises structural ribbings 312 on second side 302.

In one embodiment, the entire endplate 300 is overmolded with a resilient material completely covering the endplate.

The resilient material on the first side of the endplate acts as an endblock. In this embodiment, the resilient material also covers all surfaces contacting the working fluid, such as the passageways, and provides seals with other components in the seal area. For example, connector fittings may be integral to the inlet/outlet passageways 304 and may be overmolded to provide integral seals. Likewise, passageways 306 and 308 may comprise protruded periphery portions adjacent the passageways, as well as recessed periphery portions adjacent the passageways on the first and/or second sides of the covered endplate.

In another embodiment, selected surfaces of the endplate 300 may be overmolded to provide an endblock. For example, a first side of the endplate may be overmolded with a resilient material to provide an endblock, wherein a second surface of the endblock is bonded to the endplate. As noted above, the connector fitting may be integral to the inlet/outlet passageways and similarly overmolded. Additionally, it may be desired to overmold the passageways 306 and 308 as described above.

Figure 16:
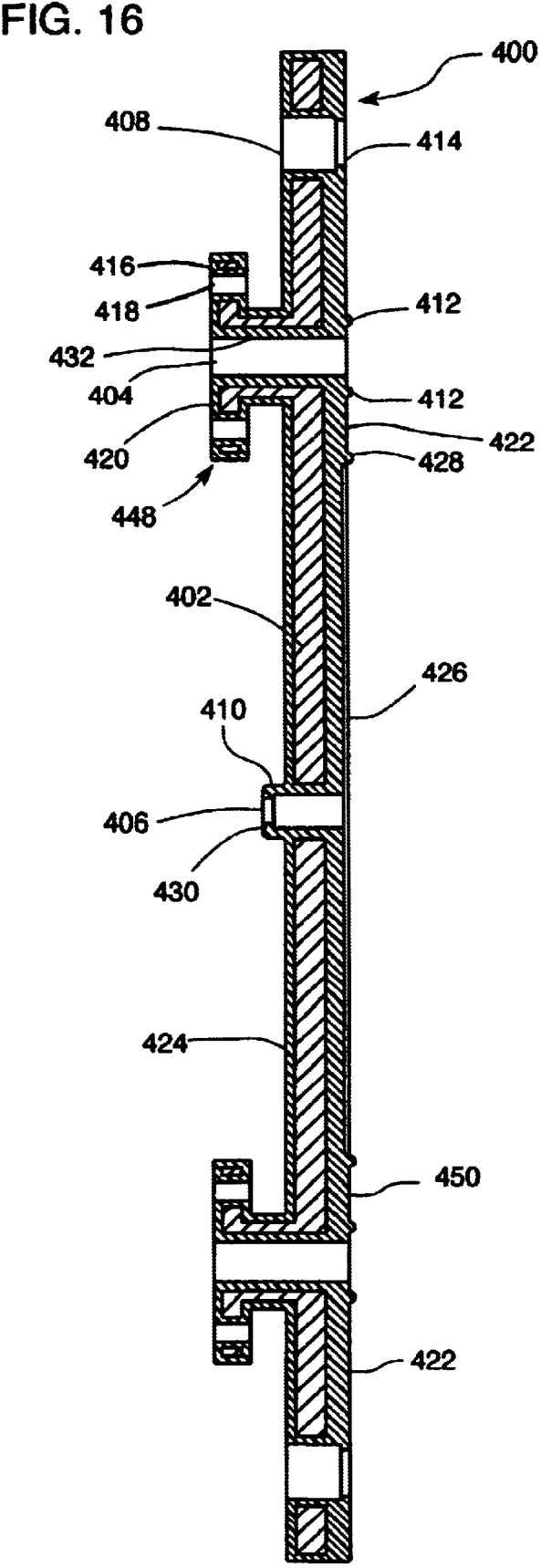
FIG. 16 is a cross section of a completely overmolded endplate.

FIG. 16 shows endplate 402 completely overmolded with, or encased within, a resilient material 450 forming a combination endplate/endblock 400. Endplate 402 differs from endplate 300 in the configuration of fluid inlet/outlet connector fitting 448 of passageway 404. As seen in FIG. 16, connector fitting 448 comprises a flange 416 integral to the endplate, having a passageway 418 for receiving a connector to external piping (not shown) such as a screw, pin or bolt. Resilient material 450 contacts all surfaces forming a first surface 422 and a second surface 424 of the combined endplate/endblock 400. First surface 422 comprises a recess 426 to house an electrode (not shown). A protrusion 428 extends from the first surface 422 adjacent the recess 426 to provide a fluid tight seal around the electrode when the first surface 422 is compressed against a concentrate spacer when assembled. Similarly, a fluid inlet/outlet comprises passageway 404 extending from the first surface 422 through the connector fitting 448. Protrusion 412 on the first side 422 adjacent passageway 404 compresses against the concentrate spacer when assembled to provide a fluid tight seal. Flange 416 of connector fitting 448 is also entirely overmolded with a resilient material providing a protruded periphery portion 432 extending from first surface 422 adjacent passageway 404 and contacting an interior wall of passageway 404. The resilient material also contacts a top surface of the flange 416 forming a lip 420, that acts like a gasket when the flange is mated with an exterior connection. Passageway 406 extending from the first surface 422 to the second surface 424 is for receiving an electrode connection and includes a protruded periphery portion 410 adjacent passageway 406. Protruded periphery portion 410 extends from the first surface 422 through passageway 406 and extends from the second surface 424, terminating in a lip 430 extending inward toward the electrode connection (not shown). Passageway 408 extends from the first surface 422 to the second surface 424 and receives a tie-bar or a tie-bar positioned in a sleeve (not shown). The second surface 424 has a recessed periphery portion 414 adjacent the passageway 408 resulting in a seal forming with the tie-bar sleeve when installed. As shown in FIG. 16, as a result of the overmolding process, each of the passageways 404, 406, 408 are lined with a resilient material 450 providing fluid tight seals around each passageway.

Figure 17:
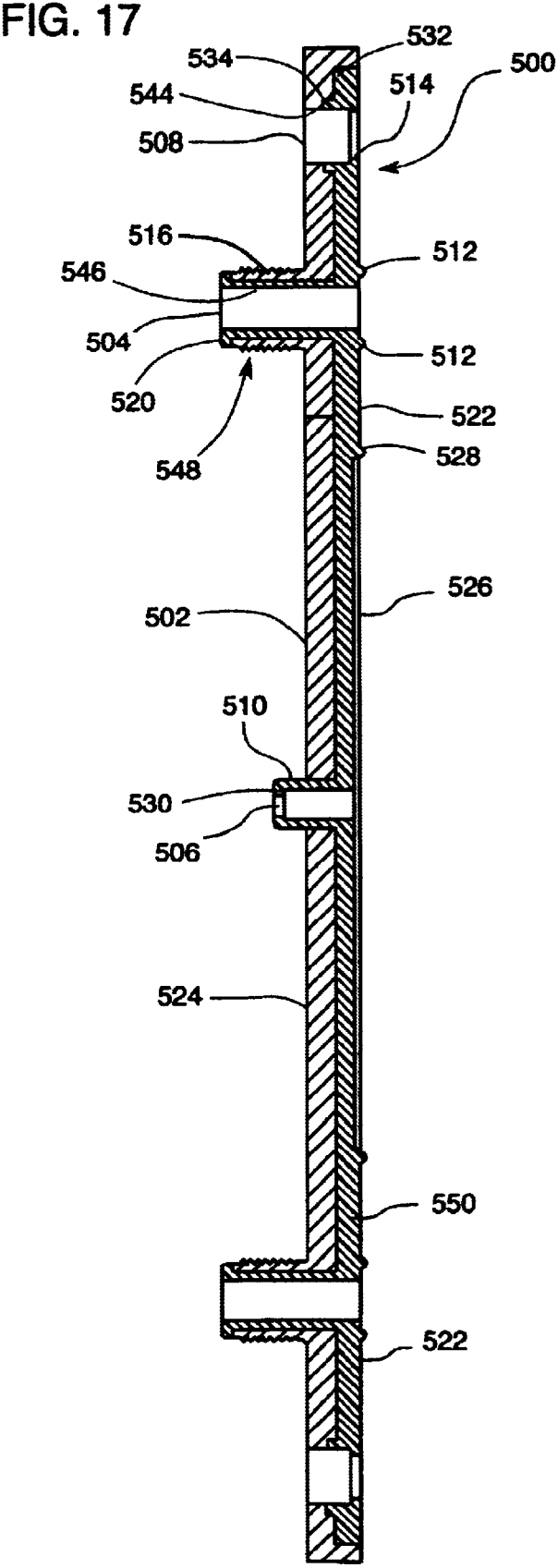
FIG. 17 is a cross section of a partially overmolded endplate.

FIG. 17 shows another embodiment of an endplate 502 partially overmolded with a resilient material 550. A first surface 522 comprises a resilient material 550 housed in recessed surface 532 of endplate 502. Passageway 504 extends from a first surface 522 through an integral connector fitting 548 for passing fluid from an adjacent fluid compartment to external piping (not shown). Connector fitting 548 comprises threads 516 for attaching to a correspondingly threaded external piping. Protruded periphery portion 546 adjacent passageway 504 extends from the first surface 522 through passageway 504. Protruded periphery portion 546 contacts an interior wall of passageway 504 and extends beyond an end of connector fitting 548 and outwardly against the end forming a lip 520 that acts like a gasket when the fitting is mated with an exterior connection. First surface 522 comprises a resilient material having a recess 526 to house an electrode and protrusion 528 similar to recess 426 and protrusion 428, respectively, of combined endplate/endblock 400. Likewise, passageway 506 is similar to passageway 406 of FIG. 16. The recessed surface 532 of endplate 502 comprises a recessed periphery portion 534 adjacent passageway 508 for housing resilient material 550. The resilient material in the recessed periphery portion 534 forms an extension of an interior wall 544 of passageway 508, terminating at protrusion 514 extending inward toward the passageway 508. Protrusion 514 forms a fluid tight seal around a tie-bar or a tie-bar sleeve (not shown).

Figure 18:
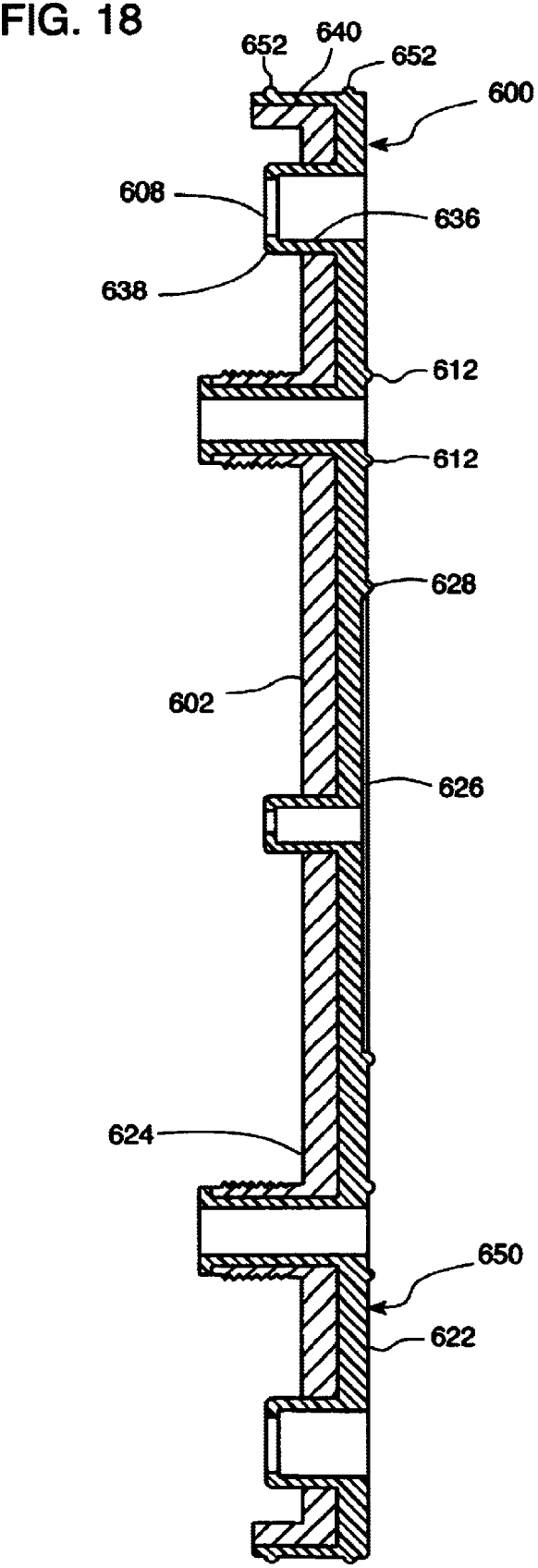
FIG. 18 is a cross section of a partially overmolded circular endplate.
Figure 19:
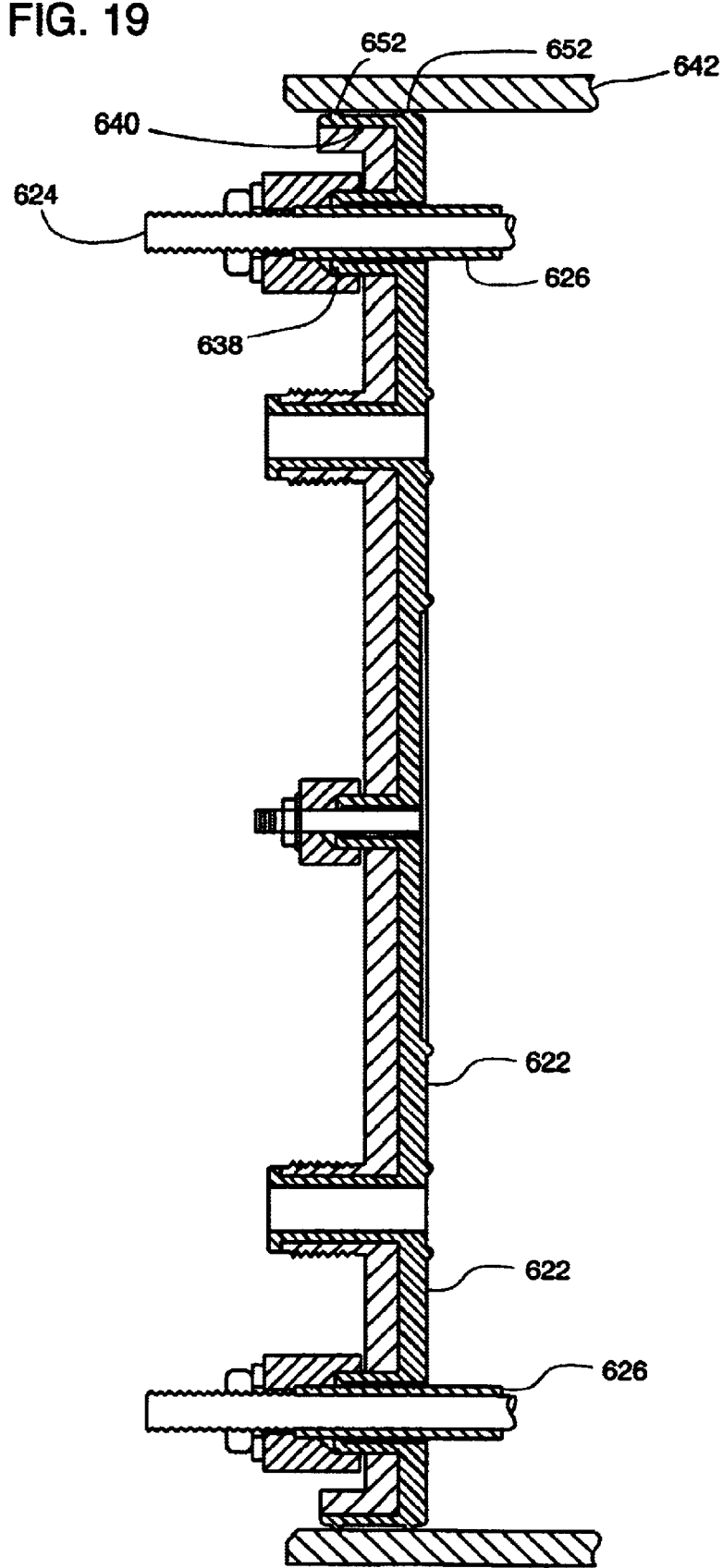
FIG. 19 is a cross section of the circular endplate of FIG. 18 positioned within a pressure vessel.

In another embodiment of the present invention shown in FIGS. 18 and 19, circular endplate 602 is partially overmolded with a resilient material 650. Resilient material 650 contacts one side of the endblock 602 forming a first surface 622, as well as completely contacting an interior wall of passageways 604, 606, and 608. In this embodiment, passageway 608 for receiving a tie bar or sleeve extends from a first surface 622 to a second surface 624. A protruded periphery portion 636 extends into passageway 608 contacting an interior wall of the passageway 608. The protruded periphery portion 636 further extends beyond the second surface 624 and terminates in a lip 638 extending inward to a tie bar sleeve 626 as shown in FIG. 19. Endplate 602 further includes a circumferential surface 640 which is also overmolded with resilient material 650 having at least one protrusion 652. The at least one protrusion 652 compress against an interior wall of a vessel 642 when assembled to provide a fluid tight seal with the vessel.

In another embodiment, the endplate and endblock may be formed of the same material resulting in a single combined endblock and endplate structure. In this embodiment, the combined endblock/endplate may be molded form a resilient material which provides sufficient structural strength when assembled as well as sufficient hardness to provide seals with other components of the electrodeionization device.

In another embodiment, the endplate and endblock may be formed as one part utilizing injection molding techniques including, but not limited to, multi-shot molding and co-injection molding. In a two-shot molding process, for example, an injection molding machine is equipped with two independent injection systems. A first material is injected into a first mold volume through a primary injection molding system, as in a normal injection molding process. The mold is then opened and a coreplate or baseplate is moved to a secondary injection molding station. The mold is again closed to expose a volume for a second material to a secondary injection system. The second material is then injected to form a surface covering completely or partially the first material. After the complete part has cooled, it is ejected from the mold. In a co-injection molding process, two or more materials are sequential or simultaneously injected into the same mold to form one or more skin material(s) surrounding a core material. Other multicomponent molding processes are possible and known to those skilled in the art.

EXAMPLE

One embodiment of an electrodeionization apparatus endblock of the present invention is molded from a SANTOPRENE® resin blend of ethylene propylene diene rubber and polypropylene. In this embodiment, the endplate has an overall dimension of approximately 12 inches by 23 inches with a thickness of approximately 5/32 inch.

A first surface of the endplate comprises a recess to house an electrode. The recess is approximately 4.3 inches by approximately 14.8 inches having a depth of about 0.03 inch. The endblock also includes a passageway for receiving an electrode connection. The electrode connection passageway extends from the recess to the second surface of the endblock and has a protruded periphery portion extending from the second surface and adjacent the passageway and is approximately 3/16 inch high. The first surface and the second surface each have a recessed periphery portion adjacent the passageway. The recesses on the first surface and on the second surface form a seal with the electrode connection.

In addition 14 circular tie-bar passageways are positioned around an outer perimeter of the endblock, extending from the first surface to the second surface. Each tie-bar passageway comprises a protruded periphery portion extending from the second surface and adjacent each passageway. The protruded periphery portion is approximately 3/16 inch in height and 3/16 inch in width. The first surface has a recessed periphery adjacent each tie-bar passageway. In addition to the recessed periphery of the first surface, the second surface has a recessed periphery portion adjacent each tie-bar passageway. The recessed periphery portions on the first surface and on the second surface form a seal with a respective tie-bar sleeve positioned in the passageway.

The endblock further includes four passageways extending through the body of the endblock from the first surface to the second surface, providing inlets/outlets for the electrodeionization apparatus. Each passageway for the inlets/outlets comprises a connector fitting overmolded to the endblock. The connector fitting is premolded from glass-filled polypropylene and comprises a first end having a flange, a second end, and an interior wall defining an orifice. Each flange is bonded to the second surface of the endblock, adjacent a corresponding passageway. Each connector fitting passageway also includes a protruded periphery portion, extending through the connector fitting and bonded to the interior wall of the connector fitting. Each protruded periphery portion extends beyond the second end of each connector fitting. A lip extends outward from the protruded periphery, contacting an entire surface of the second end of the connector fitting, forming a gasket integral to the endblock and bonded to the connector fitting. A straight exterior surface of the connector fitting comprises threads for receiving a corresponding threads of a connector to a point of use or a point of entry. Each connector fitting also includes a tab, extending from the flange toward the second end of the connector fitting, integrally molded to the flange and exterior side wall of the connector fitting, below the threads.

The endblock, also includes four passageways positioned along the perimeter of the endblock, outside a working area of the electrodeionization apparatus.

Further modifications and equivalents of the invention herein disclosed will occur to persons skilled in the art using no more than routine experimentation, and all such modifications and equivalents are believed to be within the spirit and scope of the invention as defined by the following claims.

What is claimed is:

1. An electrodeionization apparatus comprising at least one endblock formed of a resilient material.

2. The electrodeionization apparatus of claim 1, wherein the resilient material has a Shore A hardness of between about 40 and about 90.

3. The electrodeionization apparatus of claim 2, wherein the Shore A hardness is between about 50 to about 80.

4. The electrodeionization apparatus of claim 1, wherein the resilient material is ethylene propylene diene rubber.

5. The electrodeionization apparatus of claim 1, wherein the at least one endblock comprises a first surface adjacent an electrode and a second surface adjacent an endplate.

6. The electrodeionization apparatus of claim 5, wherein the at least one endblock further comprises a plurality of passageways.

7. The electrodeionization apparatus of claim 6, wherein the plurality of passageways comprises at least one inlet and at least one outlet.

8. The electrodeionization apparatus of claim 7, wherein the first surface comprises a recess constructed and arranged to receive at least a portion of an electrode.

9. The electrodeionization apparatus of claim 7, wherein the at least one inlet and at least one outlet are formed from protrusions extending from the second surface.

10. The electrodeionization apparatus of claim 9, wherein the endblock further comprises at least one connector fitting comprising a material selected from the group consisting of a plastic, a glass-filled plastic, a mineral-filled plastic, structural foam plastic, and combinations thereof.

11. The electrodeionization apparatus of claim 10, wherein the at least one connector fitting is bonded to the protrusion forming one of the at least one inlet or the at least one outlet.

12. The electrodeionization apparatus of claim 11, wherein the at least one connector fitting further includes means for securing the electrodeionization device to at least one of a point of use and a point of entry.

13. The electrodeionization apparatus of claim 10, wherein the plastic is polypropylene.

14. The electrodeionization apparatus of claim 6, wherein at least one of the plurality of passageways comprises a recessed periphery portion adjacent to the first surface.

15. The electrodeionization apparatus of claim 6, wherein at least one of the plurality of passageways comprises a protruded periphery portion extending from second surface.

16. The electrodeionization apparatus of claim 6, wherein at least one of the plurality of passageways comprises a protruded periphery portion extending from the first surface.

17. The electrodeionization apparatus of claim 5, wherein the endblock has a thickness between the first surface and the second surface of less than about 0.75 inch.

18. The electrodeionization apparatus of claim 17, wherein the thickness is less than about 0.25 inch.

19. The electrodeionization apparatus of claim 18, wherein the thickness is less than about 0.18 inch.

20. The electrodeionization apparatus of claim 19, wherein the thickness is between about 0.06 inch and about 0.12 inch.

21. An electrodeionization apparatus comprising:
an ion-depleting compartment;
an ion-concentrating compartment; and
an endblock having a first surface adjacent an electrode and a second surface adjacent an endplate, wherein the endblock is formed of a resilient material.

22. The electrodeionization apparatus of claim 21, further comprising a plurality of passageways.

23. The electrodeionization apparatus of claim 22, wherein the plurality of passageways comprises at least one inlet and at least one outlet.

24. The electrodeionization apparatus of claim 22, further comprising a plurality of tie-bars, wherein the endblock further comprises means for providing a fluid-tight seal between the endblock and the plurality of tie-bars.

25. The electrodeionization apparatus of claim 22, wherein the endblock includes means for providing a fluid tight seal between the endblock and a connector to the electrode.

26. The electrodeionization apparatus of claim 25, wherein the first surface of the endblock includes a recess constructed and arranged to receive the electrode.

27. The electrodeionization apparatus of claim 25, further comprising at least one connector fitting, wherein the endblock further comprises means for providing a fluid tight seal between the endblock and the at least one connector fitting.

28. The electrodeionization apparatus of claim 27, wherein the endblock further includes means for providing a fluid tight seal between the at least one connector fitting and one of a point of use or a point of entry.

29. The electrodeionization apparatus of claim 28, wherein the at least one connector fitting is comprised of a material selected from the group consisting of a plastic, a glass-filled plastic, a mineral-filled plastic, structural foam plastic, and combinations thereof.

30. The electrodeionization apparatus of claim 29, wherein the plastic is polypropylene.

31. The electrodeionization apparatus of claim 21, wherein the resilient material has a Shore A hardness of between about 40 and about 90.

32. The electrodeionization apparatus of claim 31, wherein the resilient material has a Shore A hardness of between about 50 and about 80.

33. The electrodeionization apparatus of claim 21, wherein the endplate is formed from the resilient material.

34. The electrodeionization apparatus of claim 21, wherein the second surface of the endblock is bonded to the endplate.

35. The electrodeionization apparatus of claim 34, wherein the endplate is covered with the resilient material.

36. An electrodeionization apparatus comprising at least one endplate encased in a resilient material.

37. The electrodeionization apparatus of claim 36, wherein the at least one endplate is partially encased in the resilient material.

38. The electrodeionization apparatus of claim 36, wherein the at least one endplate is completely encased in the resilient material.

* * * * *

UNITED STATES PATENT AND TRADEMARK OFFICE
CERTIFICATE OF CORRECTION

PATENT NO. : 6,758,954 B2 Page 1 of 1
DATED : July 6, 2004
INVENTOR(S) : Li-Shiang Liang et al.

It is certified that error appears in the above-identified patent and that said Letters Patent is hereby corrected as shown below:

<u>Title page,</u>
Item [73], Assignee, replace "U.S. Filter Corporation" with -- United States Filter Corporation --

Signed and Sealed this

Thirtieth Day of November, 2004

JON W. DUDAS
*Director of the United States Patent and Trademark Office*